United States Patent
Steffen (10) Patent No.: US 11,326,694 B2
(45) Date of Patent: May 10, 2022

(54) CRYOGENIC PISTON RING IMPROVEMENT

(71) Applicant: ACD, LLC, Santa Ana, CA (US)

(72) Inventor: Joshua Wayne Steffen, Ladera Ranch, CA (US)

(73) Assignee: ACD, LLC, Santa Ana, CA (US)

( * ) Notice: Subject to any disclaimer, the term of this patent is extended or adjusted under 35 U.S.C. 154(b) by 0 days.

(21) Appl. No.: 17/247,542

(22) Filed: Dec. 15, 2020

(65) Prior Publication Data

US 2021/0180694 A1 Jun. 17, 2021

Related U.S. Application Data

(60) Provisional application No. 62/949,409, filed on Dec. 17, 2019.

(51) Int. Cl.
*F16J 9/18* (2006.01)
*F16J 9/14* (2006.01)
*F04B 53/14* (2006.01)
*F16J 9/00* (2006.01)
*F16J 9/16* (2006.01)

(52) U.S. Cl.
CPC .............. *F16J 9/145* (2013.01); *F04B 53/14* (2013.01); *F16J 9/00* (2013.01); *F16J 9/16* (2013.01); *F16J 9/18* (2013.01)

(58) Field of Classification Search
CPC .......... F16J 9/18; F16J 9/16; F16J 9/20; F16J 9/145; F04B 53/143
See application file for complete search history.

(56) References Cited

U.S. PATENT DOCUMENTS

| | | | |
|---|---|---|---|
| 5,474,307 A | 3/1995 | Debiasse et al. | |
| 8,177,237 B2* | 5/2012 | Lindner-Silwester | F16J 9/18 |
| | | | 277/487 |
| 9,133,933 B1* | 9/2015 | Feistel | F16J 9/18 |
| 2003/0024387 A1 | 2/2003 | Langenfeld et al. | |
| 2003/0080512 A1* | 5/2003 | Colson | F04B 53/143 |
| | | | 277/404 |
| 2013/0305918 A1 | 11/2013 | Okazaki et al. | |

FOREIGN PATENT DOCUMENTS

| | | | |
|---|---|---|---|
| CN | 109458323 A | 3/2019 | |
| JP | 2553203 B2 | 11/1996 | |

* cited by examiner

*Primary Examiner* — F Daniel Lopez
(74) *Attorney, Agent, or Firm* — Hackler Daghighian Martino & Novak (57) ABSTRACT

A piston ring set of a cryogenic pump includes a first piston ring and a second piston ring which are dissimilarly shaped and cooperatively shaped to form a hollow cylindrical shape when in abutment to one another. The first piston ring is C-shaped and defines a middle portion disposed between a first end portion and a second end portion. A piston ring gap is disposed between a first distal end of the first end portion and a second distal end of the second end portion. When the first piston ring is in abutment with the second piston ring forming the hollow cylindrical shape, the second piston ring does not extend along the middle portion of the first piston ring while the second piston ring does extend along the first end portion and second end portion of the first piston ring.

12 Claims, 6 Drawing Sheets

CRYOGENIC PISTON RING IMPROVEMENT

CROSS-REFERENCE TO RELATED APPLICATIONS

This application claims priority to the provisional application 62/949,409 filed on Dec. 17, 2019, the entire contents of which are hereby incorporated in full by this reference.

DESCRIPTION:

Field of the Invention

The present invention generally relates to piston rings. More particularly, the present invention relates to an improvement for cryogenic piston rings.

Background of the Invention

A piston ring is a metallic split ring that is attached to the outer diameter of a piston for engines of various designs and/or for various pumps. For example, such engines include internal combustion engines, steam engines and even cryogenic pumps and the like. The main functions of piston rings in engines are to seal the combustion chamber so that there is minimal loss of gases to the crank case. A good piston ring design is critical for improving heat transfer from the piston to the cylinder wall, maintaining the proper quantity of the oil between the piston and the cylinder wall and regulating engine oil consumption by scraping oil from the cylinder walls back to the sump. In pumps, a good piston ring design prevents the loss of pressure and moves the fluid or gas to be pumped in a more efficient manner.

As can be seen, piston ring design is an important factor when designing engines and pumps. Accordingly, there is a need for an improved piston ring design for cryogenic applications. The present invention fulfills these needs and provides other related advantages.

SUMMARY OF THE INVENTION

An exemplary embodiment of a piston ring set (100) of a cryogenic pump, comprises: a first piston ring (112a) defining a longitudinal axis (114) along a center (115) of the first piston ring; and a second piston ring (112b) concentrically disposed in relation to the first piston ring along the longitudinal axis; wherein the first and second piston rings are dissimilarly shaped; wherein the first and second piston rings are cooperatively shaped to form a hollow cylindrical shape when in abutment to one another; wherein the first piston ring is C-shaped and defines a middle portion (116) disposed between a first end portion (117) and a second end portion (118); wherein a piston ring gap (119) is disposed between a first distal end (117d) of the first end portion and a second distal end (118d) of the second end portion; wherein, when the first piston ring is in abutment with the second piston ring forming the hollow cylindrical shape, the second piston ring does not extend along the middle portion of the first piston ring while the second piston ring does extend along the first end portion and second end portion of the first piston ring.

In other exemplary embodiments, the first piston ring may define an outer diameter surface (122) opposite an inner diameter surface (124), which may be contiguous with and disposed between a top surface (126) which may be opposite a bottom surface (128); wherein the outer diameter surface along the middle portion, the first end portion and the second end portion may be the same diameter; wherein the top surface along the middle portion, the first end portion and the second portion may be in the same plane; wherein the inner diameter surface (124a) along the first end portion and second end portion may be larger in diameter in comparison to the inner diameter surface (124b) along the middle portion; and wherein the bottom surface (128a) of the middle portion may be not in the same plane as the bottom surface (128b) of the first end portion and second end portion.

In other exemplary embodiments, the second piston ring may define an inner diameter surface (134) disposed opposite a first (132) and a second outer diameter surface (133) and a bottom surface (138) disposed opposite a first (136) and a second top surface (137), wherein the inner diameter surface may be contiguous to the first top surface which in turn may be contiguous to the second outer diameter surface which in turn may be contiguous to the second top surface which in turn may be contiguous to the first outer diameter surface which in turn may be contiguous to the bottom surface which in turn may be contiguous with the inner diameter surface; wherein first outer diameter surface may be larger in diameter in comparison to the second outer diameter surface; and wherein the first and second top surfaces may be not in the same plane.

In other exemplary embodiments, when the first piston ring may be in abutment with the second piston ring forming the hollow cylindrical shape, the following may be true: the top surface (126) of the first piston ring is in alignment with the first top surface (136) of the second piston ring; the outer diameter surface (122) of the first piston ring is in alignment with the first outer diameter surface (132) of the second piston ring; the bottom surface (128) of the first piston ring along the middle portion is in alignment with the bottom surface (138) of the second piston ring; the inner diameter surface (124) of the first piston ring along the first and second portions abuts the second outer diameter surface (133) of the second piston ring; and the bottom surface (128) of the first piston ring along the first and second portions abuts the second top surface (137) of the second piston ring.

In other exemplary embodiments, a cross sectional area taken along a plane containing the longitudinal axis through the middle portion may be larger in comparison to a cross sectional area taken along the plane containing the longitudinal axis through either the first end portion or the second end portion.

In other exemplary embodiments, it may include a second piston ring protrusion (140) configured to be disposed between the piston ring gap of the first piston ring when the first piston ring is in abutment with the second piston ring forming the hollow cylindrical shape.

In other exemplary embodiments, the second piston ring protrusion may extend outwardly from the second outer diameter surface and the first outer diameter surface of the second piston ring.

In other exemplary embodiments, it may include an expander ring (120) configured to be disposed concentrically within the first and second piston rings.

In other exemplary embodiments, the expander ring may have an expander ring gap (140) disposed between a first distal end (142d) and a second distal end (143d) of the expander ring.

In other exemplary embodiments, it may include a first piston ring protrusion (144) configured to be disposed between the expander ring gap.

In other exemplary embodiments, the first piston ring protrusion may extend inwardly from the inner diameter surface at a center (146) of the middle portion of the first piston ring.

In other exemplary embodiments, the first and second piston ring may comprise PTFE and the expander ring may comprise austenitic stainless steel or beryllium copper.

In other exemplary embodiments, the outer diameter surface of the first piston ring and the first outer diameter surface of the second piston ring may be configured to abut against an inner surface (21) of a bore (20) of a cryogenic pump.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As used herein the term "fluid" encompasses both liquids and gasses, which can occur separately or occur at the same time.

Figure 1:
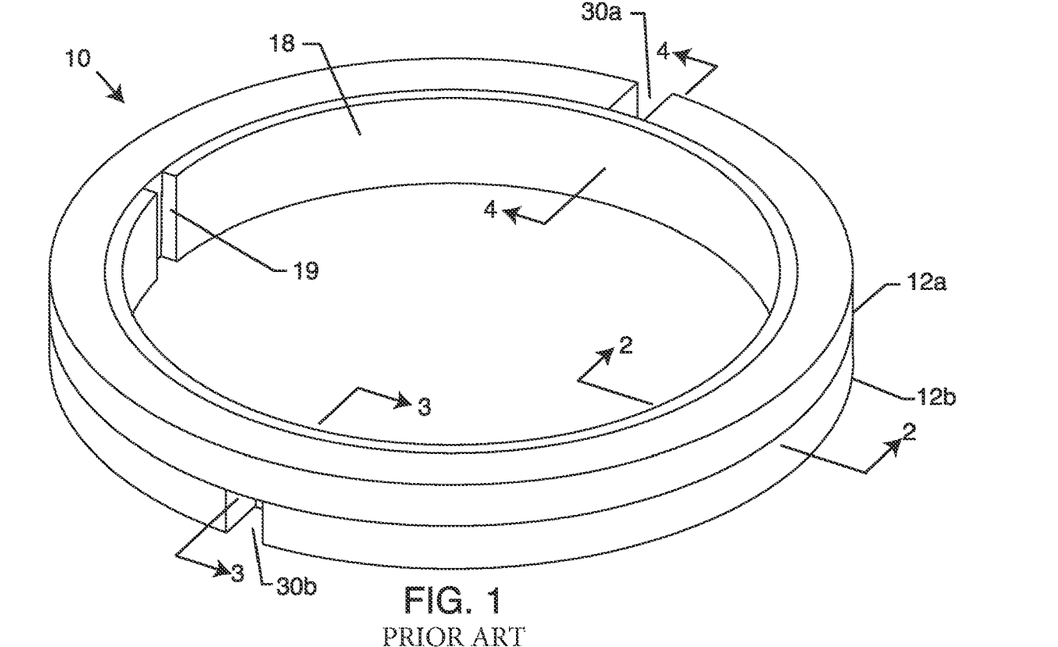
FIG. 1 shows a perspective view of a traditional piston ring design.
Figure 2:
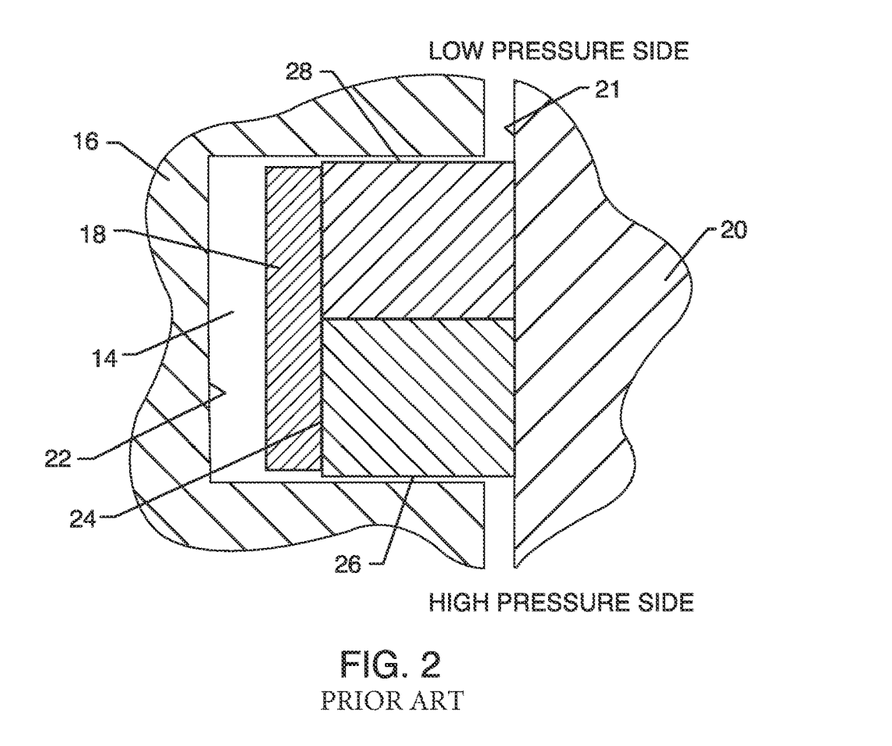
FIG. 2 is a sectional view taken generally along lines 2-2 from FIG. 1 and now showing the piston rings disposed within a piston and bore.

FIG. 1 shows a perspective view of a traditional piston ring design 10. FIG. 2 is a sectional view taken generally along lines 2-2 from the structure of FIG. 1 now showing the piston rings disposed within a piston and bore. The piston rings 12a and 12b are two identical piston rings 12a and 12b which are placed into the same piston groove 14 of a piston 16. An expander ring 18 is disposed concentrically within the piston rings 12a and 12b to create an outwardly biasing force to create contact between the piston rings and the bore 20 they are placed within. As can be seen in FIG. 1, the upper piston ring 12a is installed 180 degrees in rotation in comparison to the lower piston ring 12b to reduce blow by when in use.

The problem with this traditional design is that there is a direct leak path under the ring axially to the rear of the piston ring between the piston groove outer diameter 22 and the piston ring inner diameter 24. First, there exists a front gap 26 that is open while the piston travels downward during pumping. Fluid is free to enter the space 14 behind the piston ring.

Figure 3:
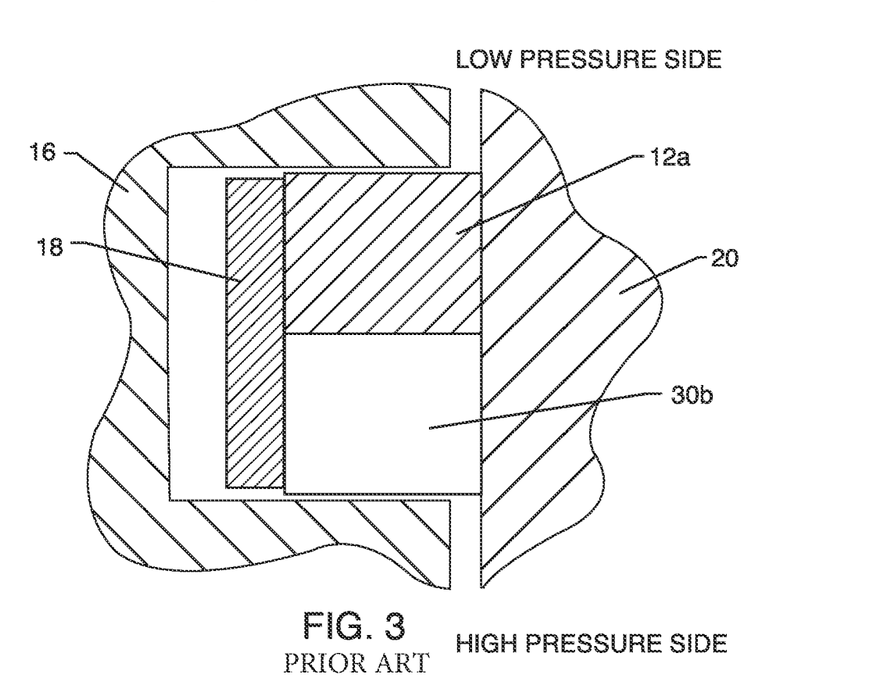
FIG. 3 is a sectional view taken generally along lines 3-3 from FIG. 1 and now showing the piston rings disposed within a piston and bore and the lower piston gap.
Figure 4:
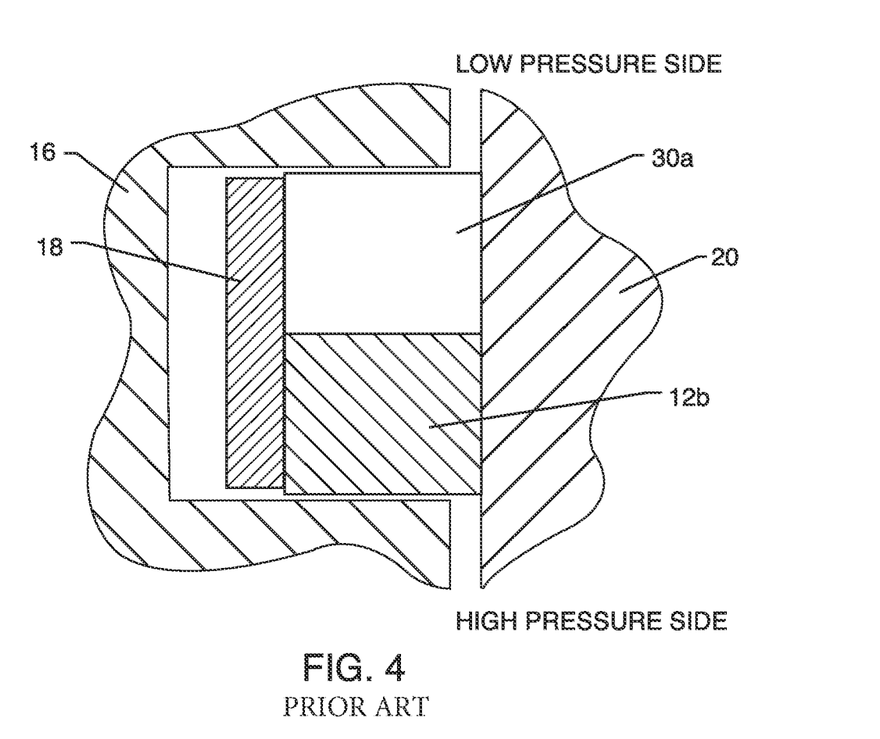
FIG. 4 is a sectional view taken generally along lines 4-4 from FIG. 1 and now show the piston rings disposed within a piston and bore and the upper piston gap.

Second, as best seen in FIG. 3, the gap 30b in the lower ring 12b provides a direct leak path to the region behind the piston ring, in the groove. Once the fluid has entered the area behind the piston ring, it is free to travel around the piston groove to find the gap 30a in the upper ring as best shown in FIG. 4 and flow freely out to the low pressure side. It is believed this is the most significant leak path in the whole pump, and has a significant impact to pump performance. The gaps 30a and 30b are generally held to very low (near zero) size at install at ambient temperatures. Once in operation, depending on the cryogenic fluid, and since the material of the piston ring has a much higher coefficient of thermal expansion, the material will shrink relative to the piston and bore, and the gaps will therefore open up further.

Figure 5:
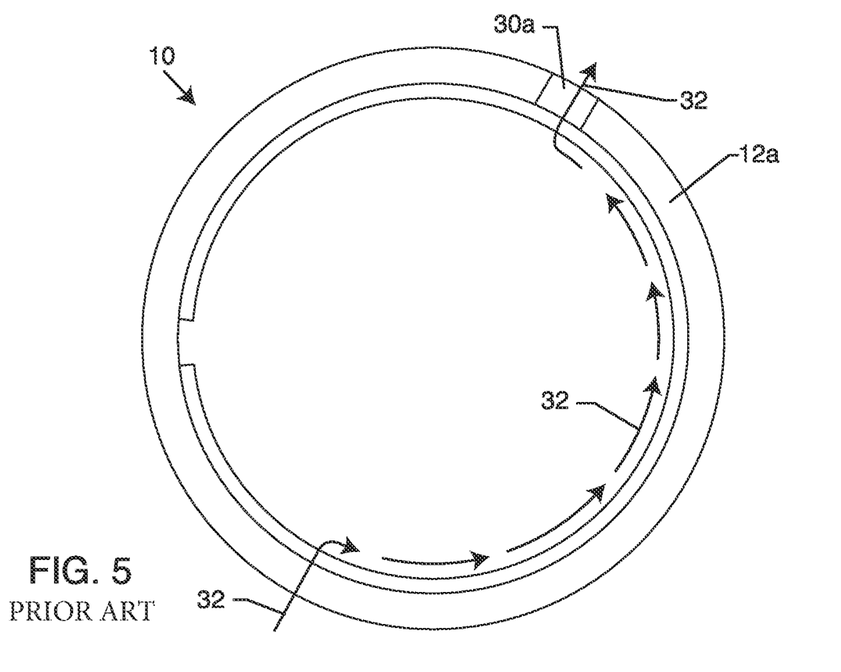
FIG. 5 is a top view of the structure of FIG. 1 now showing the leak path between the two piston gaps.

FIG. 5 is a top view of the structure of FIG. 1. The leak path 32 is best depicted as traveling from the gap 30b, around the inside of the piston rings to reach the other gap 30a.

To make matters worse, it has be observed at times during operation that the gaps 30a and 30b between the top and bottom ring may rotate and align during operation. This further reduces the sealing capability and provides a very direct leak path directly through the piston rings.

Finally, as the piston ring wears during service, the gaps and other tolerances will continue to open further, again exaggerating the leak rate and reducing performance.

The expander ring 18 serves to keep the piston rings in contact with the inner surface 21 of the bore 20 at all times. For example, when the piston rings shrink as they are exposed to cryogenic fluid temperatures, the expander ring forces the piston rings outward, so they remain in contact with the bore wall, and force the fluid to leak through the ring gaps and through the inside of the ring, rather than around the outside, which would collapse the ring and expander, and open a large leak path.

It is also worth noting that the expander ring 18 can also rotate relative to the piston rings such that the expander ring gap 19 may undesirably line up with the either or both of the gaps 30a and 30b.

FIGS. 6-11 illustrate an embodiment of a piston ring set 100 of the present invention intended to reduce the direct leak path in traditional rings due to thermal contraction, rotation during operation and wear. The new proposed piston ring design for cryogenic pumps is intended to reduce or eliminate these three issues.

As now shown, there are two dissimilarly (not identical) shaped piston rings 112a and 112b to the piston ring assembly 100 that cooperatively work together. The larger piston ring 112a usually is positioned on top (on the downstream side/low pressure side of the piston groove) and provides a continuous seal except for the gaps near the tab (protrusion 140) of the second piston ring 112b. The fluid that enters the rear of the piston ring set now has to travel through a small gap between the top 112a and bottom rings 112b until it finds its way to the tab 140 where the gap then exits on the outside of the top ring 112a. As now configured, this gap is loaded by pressure behind the rings to be closed tightly during operation, effectively restricting the flow and minimizing the gap. As the ring wears and shrinks, only the length of this leak path reduces, not the size, as it is always still loaded and closed by the pressure.

Figure 6:
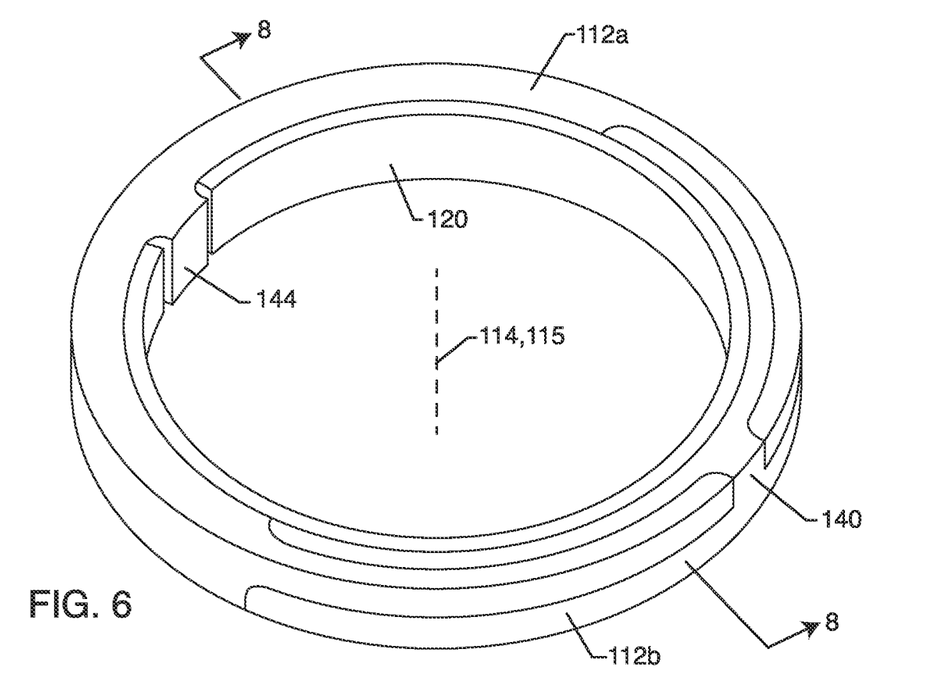
FIG. 6 is a perspective view of an embodiment of a piston ring set of the present invention.
Figure 7:
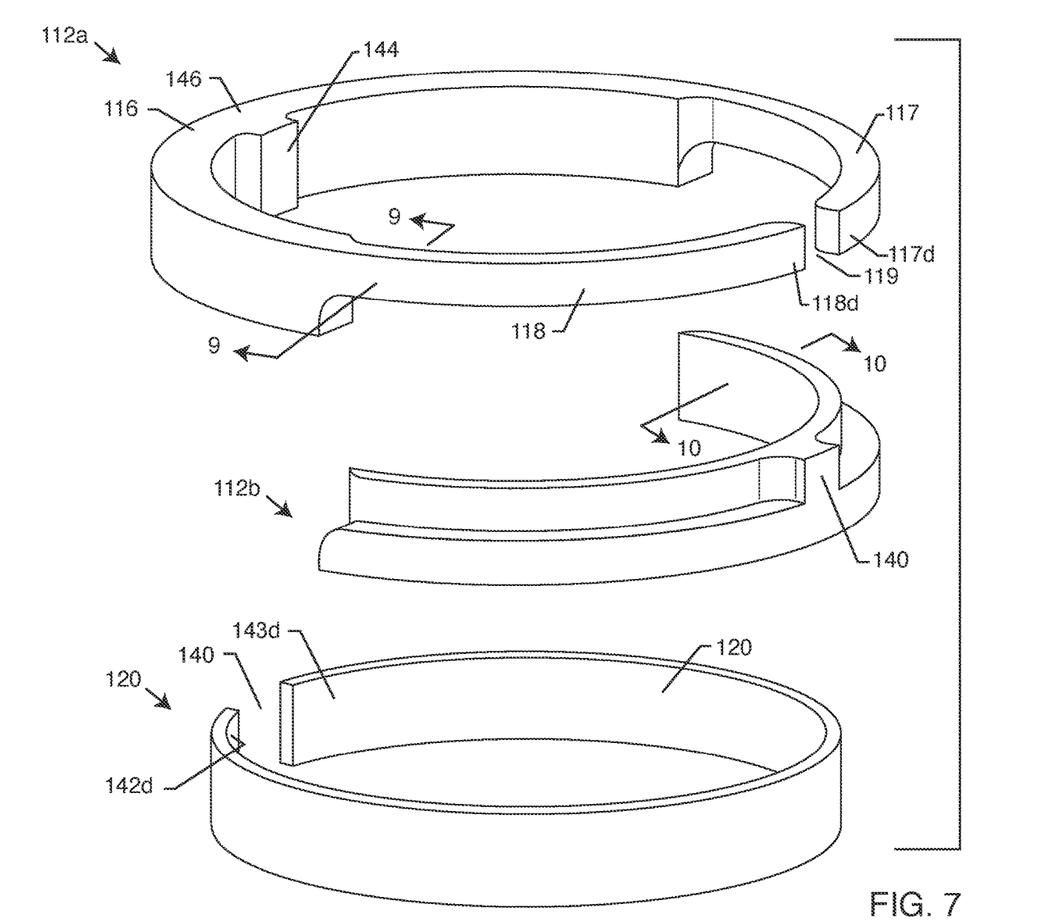
FIG. 7 is a perspective and exploded view of the structure of FIG. 6.
Figure 8:
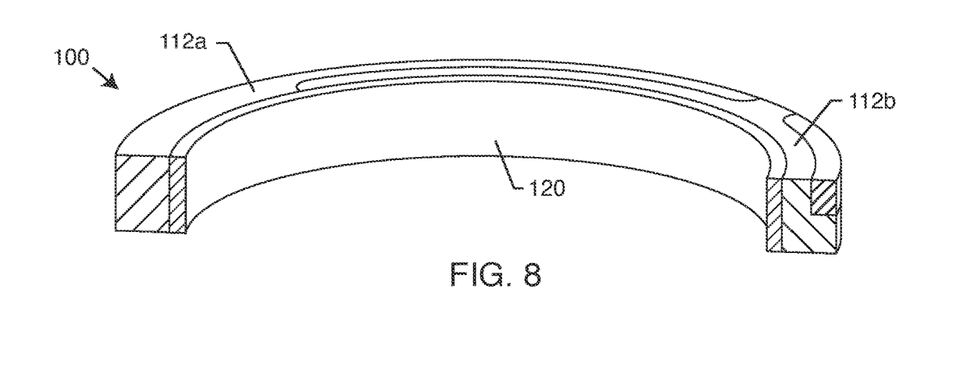
FIG. 8 is a sectional perspective view taken along lines 8-8 of FIG. 6.
Figure 9:
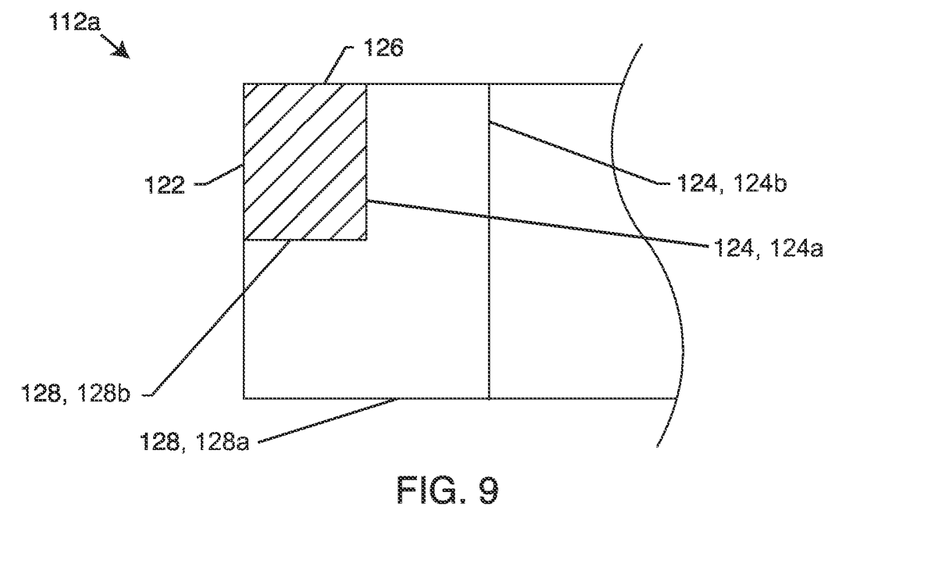
FIG. 9 is a sectional view taken along lines 9-9 from the structure of FIG. 7.
Figure 10:
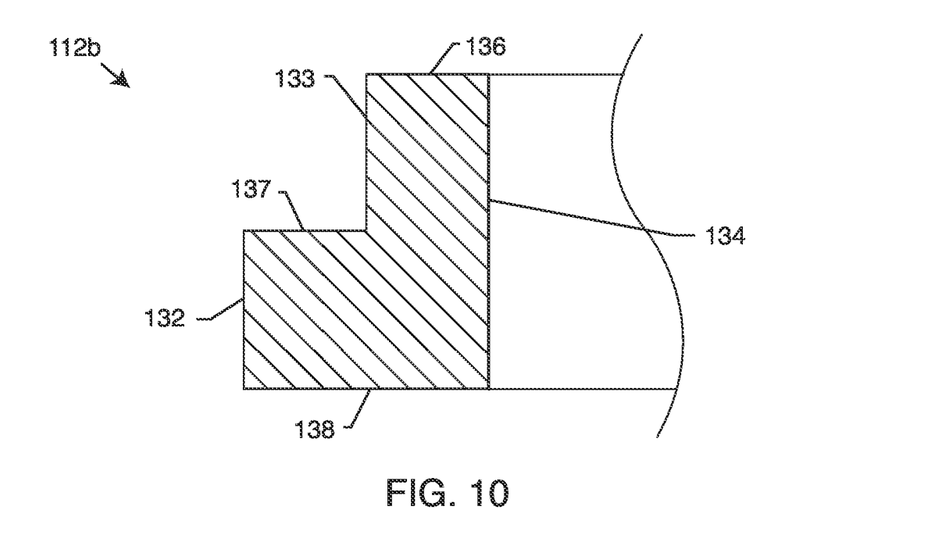
FIG. 10 is a sectional view taken along lines 10-10 from the structure of FIG. 7.
Figure 11:
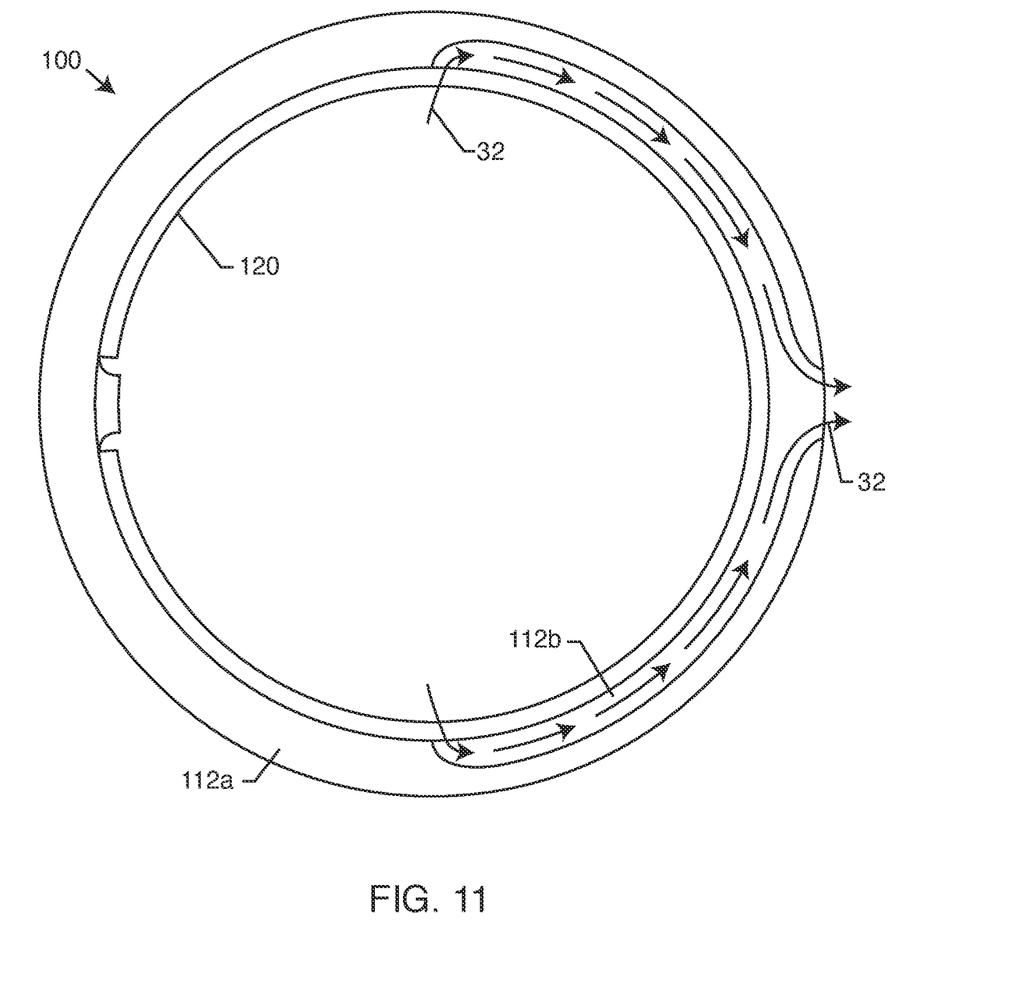
FIG. 11 is a top view of the structure of FIG. 6 now showing the reduced capacity leak path between the two piston rings.

The shape of the upper and lower piston rings are hard to describe in words, but are best understood when looking at FIGS. 6 and 7 taken in conjunction with cross sections of FIGS. 9 and 10. As can be seen, the piston ring set for the cryogenic pump has the first piston ring 112a defining a longitudinal axis 114 along a center 115 of the first piston ring. The second piston ring 112b is concentrically disposed in relation to the first piston ring along the longitudinal axis.

As can be seen best in FIG. 7, the first and second piston rings are dissimilarly shaped but also cooperatively shaped to form a hollow cylindrical shape when in abutment to one another, except for the protrusion 144. In essence, when both the upper 112a and lower piston rings 112b are together along with an expander ring 120, they form a similar overall shape as that shown in FIG. 1. This means that the piston rings of the present invention can be used to replace the piston rings of the prior art as one can be substituted for another.

The first piston ring 112a may be described as being C-shaped defining a middle portion 116 disposed between a first end portion 117 and a second end portion 118. The middle portion has a different cross sectional shape in comparison to the first and second end portions. The first and second end portions are much smaller in overall cross sectional size and are configured to cooperatively abut the shape of the lower piston ring 112b. As best shown in FIG. 7, a piston ring gap 119 is disposed between a first distal end 117d of the first end portion and a second distal end 118d of the second end portion.

When the first piston ring is in abutment with the second piston ring forming the hollow cylindrical shape, the second piston ring does not extend along the middle portion of the first piston ring while the second piston ring does extend along the first end portion and second end portion of the first piston ring. In this way the two piston rings are able to come together to cooperatively form the overall hollow cylindrical shape of the piston ring set.

To help define the shape of the first (top) piston ring 112a, it is best to now look at FIG. 9. The first piston ring defines an outer diameter surface 122 opposite an inner diameter surface 124, which is contiguous with and disposed between a top surface 126 which is opposite a bottom surface 128. The outer diameter surface along the middle portion, the first end portion and the second end portion are the same diameter throughout the first piston ring. The top surface along the middle portion, the first end portion and the second portion are in the same plane throughout the first piston ring. The inner diameter surface along the first end portion and second end portion are larger in diameter in comparison to the inner diameter surface along the middle portion. Furthermore, the bottom surface of the middle portion is not in the same plane as the bottom surface of the first end portion and second end portion.

To help define the shape of the second (lower) piston ring 112b, it is best to now look at FIG. 10. The second piston ring defines an inner diameter surface 134 disposed opposite a first 132 and a second outer diameter surface 133. Furthermore, a bottom surface 138 is disposed opposite a first 136 and a second top surface 137. When looking at FIG. 10 and moving counter-clockwise starting from the inner diameter surface, the inner diameter surface is contiguous to the first top surface which in turn is contiguous to the second outer diameter surface which in turn is contiguous to the second top surface which in turn is contiguous to the first outer diameter surface which in turn is contiguous to the bottom surface which in turn is contiguous with the inner diameter surface. It can also be said that the first outer diameter surface is larger in diameter in comparison to the second outer diameter surface and the first and second top surfaces are not in the same plane.

To further define the structure of the present invention, when the first piston ring is in abutment with the second piston ring forming the hollow cylindrical shape, the following is true: the top surface 126 of the first piston ring is in alignment with the first top surface 136 of the second piston ring; the outer diameter surface 122 of the first piston ring is in alignment with the first outer diameter surface 132 of the second piston ring; the bottom surface 128 of the first piston ring along the middle portion is in alignment with the bottom surface 138 of the second piston ring; the inner diameter surface 124 of the first piston ring along the first and second portions abuts the second outer diameter surface 133 of the second piston ring; and the bottom surface 128 of the first piston ring along the first and second portions abuts the second top surface 137 of the second piston ring.

As can be appreciated from the structure shown in FIGS. 7-10, a cross sectional area taken along a plane containing the longitudinal axis through the middle portion of the first piston ring is larger in comparison to a cross sectional area taken along the plane containing the longitudinal axis through either the first end portion or the second end portion.

Best seen in FIG. 7, the second piston ring 112b includes a second piston ring protrusion 140 configured to be disposed between the piston ring gap 119 of the first piston ring when the first piston ring is in abutment with the second piston ring forming the hollow cylindrical shape. The second piston ring protrusion extends outwardly from the second outer diameter surface and the first outer diameter surface of the second piston ring.

The piston ring material is of the same types of materials already known to the art, which must remain flexible and ductile at cryogenic temperatures, while having low friction with the bore wall and enough strength to prevent extrusion. The first and second piston ring may be made from polytetrafluoroethylene (PTFE) and various PTFE composites.

An expander ring 120 is configured to be disposed concentrically within the first and second piston rings. The expander ring pushes outwardly on the first and second piston rings to help create a contact of the piston rings to the inner surface 21 of the bore 20 of the cryogenic pump. The expander ring has an expander ring gap 140 disposed between a first distal end 142d and a second distal end 143d of the expander ring.

The first piston ring has a first piston ring protrusion 144 configured to be disposed between the expander ring gap 140, which then prevents the expander ring from rotating about the longitudinal axis when in use. The first piston ring protrusion extends inwardly from the inner diameter surface at a center 146 of the middle portion of the first piston ring.

The material of the expander ring (spring) is also the same as those known to the art. The expander ring must maintain spring load and ductility at cryogenic temperatures. Accordingly, the expander ring may be made from austenitic stainless steel or beryllium copper.

Although several embodiments have been described in detail for purposes of illustration, various modifications may be made to each without departing from the scope and spirit of the invention. Accordingly, the invention is not to be limited, except as by the appended claims.

What is claimed is:

1. A piston ring set of a cryogenic pump, comprising:
a first piston ring defining a longitudinal axis along a center of the first piston ring;
a second piston ring concentrically disposed in relation to the first piston ring along the longitudinal axis; and
an expander ring configured to be disposed concentrically within the first and second piston rings
wherein the first and second piston rings are dissimilarly shaped;
wherein the first and second piston rings and expander ring are cooperatively shaped to form a hollow cylindrical shape when in abutment to one another;
wherein the first piston ring is C-shaped and defines a middle portion disposed between a first end portion and a second end portion;
wherein a piston ring gap is disposed between a first distal end of the first end portion and a second distal end of the second end portion;
wherein, when the first piston ring is in abutment with the second piston ring forming the hollow cylindrical shape, the second piston ring does not extend along the middle portion of the first piston ring while the second piston ring does extend along the first end portion and second end portion of the first piston ring;
wherein the expander ring has an expander ring gap disposed between a first distal end and a second distal end of the expander ring; and
wherein the first piston ring includes a first piston ring protrusion configured to be disposed within the expander ring gap, and extends axially to a full axial extent of the expander ring gap.

2. The piston ring set of claim 1, wherein the first piston ring defines an outer diameter surface opposite an inner diameter surface, which are contiguous with and disposed between a top surface and an opposite bottom surface; wherein the outer diameter surface along the middle portion, the first end portion and the second end portion are the same radius from the longitudinal axis; wherein the top surface along the middle portion, the first end portion and the second portion are in the same plane; wherein the inner diameter surface along the first end portion and second end portion are larger in radius from the longitudinal axis in comparison to the inner diameter surface along the middle portion; and wherein the bottom surface of the middle portion is not in the same plane as the bottom surface of the first end portion and second end portion.

3. The piston ring set of claim 2, wherein the second piston ring defines an inner diameter surface disposed opposite a first and a second outer diameter surface and a bottom surface disposed opposite a first and a second top surface, wherein the inner diameter surface is contiguous to the first top surface which in turn is contiguous to the second outer diameter surface which in turn is contiguous to the second top surface which in turn is contiguous to the first outer diameter surface which in turn is contiguous to the bottom surface which in turn is contiguous with the inner diameter surface; wherein first outer diameter surface is larger in radius from the longitudinal axis in comparison to the second outer diameter surface; and wherein the first and second top surfaces are not in the same plane.

4. The piston ring set of claim 3, including a second piston ring protrusion configured to be disposed within the piston ring gap of the first piston ring when the first piston ring is in abutment with the second piston ring forming the hollow cylindrical shape.

5. The piston ring set of claim 4, wherein the second piston ring protrusion extends outwardly from the second outer diameter surface to the first outer diameter surface of the second piston ring.

6. The piston ring set of claim 1, wherein a cross sectional area taken along a plane containing the longitudinal axis through the middle portion is larger in comparison to a cross sectional area taken along the plane containing the longitudinal axis through either the first end portion or the second end portion.

7. The piston ring set of claim 1, wherein the first piston ring protrusion extends inwardly from the inner diameter surface at a center of the middle portion of the first piston ring.

8. The piston ring set of claim 1, wherein the first and second piston ring comprise PTFE.

9. The piston ring set of claim 1, wherein the expander ring comprises austenitic stainless steel or beryllium copper.

10. The piston ring set of claim 1, wherein the outer diameter surface of the first piston ring and the first outer diameter surface of the second piston ring are configured to abut against an inner surface of a bore of a cryogenic pump.

11. A piston ring set of a cryogenic pump, comprising:
a first piston ring defining a longitudinal axis along a center of the first piston ring;
a second piston ring concentrically disposed in relation to the first piston ring along the longitudinal axis; and
an expander ring configured to be disposed concentrically within the first and second piston rings;
wherein the first and second piston rings are dissimilarly shaped;
wherein the first and second piston rings and the expander ring are cooperatively shaped to form a hollow cylindrical shape when in abutment to one another;
wherein the first piston ring is C-shaped and defines a middle portion disposed between a first end portion and a second end portion;
wherein a piston ring gap is disposed between a first distal end of the first end portion and a second distal end of the second end portion;
wherein, when the first piston ring is in abutment with the second piston ring forming the hollow cylindrical shape, the second piston ring does not extend along the middle portion of the first piston ring while the second piston ring does extend along the first end portion and second end portion of the first piston ring;
wherein the first piston ring defines an outer diameter surface opposite an inner diameter surface, which are contiguous with and disposed between a top surface and an opposite a bottom surface;
wherein the outer diameter surface along the middle portion, the first end portion and the second end portion are the same radius from the longitudinal axis;
wherein the top surface along the middle portion, the first end portion and the second portion are in the same plane;
wherein the inner diameter surface along the first end portion and second end portion are larger in radius from the longitudinal axis in comparison to the inner diameter surface along the middle portion;
wherein the bottom surface of the middle portion is not in the same plane as the bottom surface of the first end portion and second end portion;
wherein the second piston ring defines an inner diameter surface disposed opposite a first and a second outer diameter surface and a bottom surface disposed opposite a first and a second top surface, wherein the inner diameter surface is contiguous to the first top surface which in turn is contiguous to the second outer diameter surface which in turn is contiguous to the second top surface which in turn is contiguous to the first outer diameter surface which in turn is contiguous to the bottom surface which in turn is contiguous with the inner diameter surface; wherein first outer diameter surface is larger in diameter in comparison to the second outer radius from the longitudinal axis surface; and wherein the first and second top surfaces are not in the same plane; and wherein, when the first piston ring is in abutment with the second piston ring forming the hollow cylindrical shape, the following is true:

the top surface of the first piston ring is in alignment with the first top surface of the second piston ring;

the outer diameter surface of the first piston ring is in alignment with the first outer diameter surface of the second piston ring;

the bottom surface of the first piston ring along the middle portion is in alignment with the bottom surface of the second piston ring;

the inner diameter surface of the first piston ring along the first and second portions abuts the second outer diameter surface of the second piston ring; and the bottom surface of the first piston ring along the first and second portions abuts the second top surface of the second piston ring, wherein the expander ring has an expander ring gas disposed between a first distal end and a second distal end of the expander ring, and including a first piston ring protrusion of the first piston ring configured to be disposed within the expander ring gap, and extends axially to a full axial extend of the expander ring gap.

12. A piston ring set of a cryogenic pump, comprising:

a first piston ring defining a longitudinal axis along a center of the first piston ring; and a second piston ring concentrically disposed in relation to the first piston ring along the longitudinal axis; and an expander ring configured to be disposed concentrically within the first and second piston rings;

wherein the first and second piston rings are dissimilarly shaped;

wherein the first and second piston rings and the expander ring are cooperatively shaped to form a hollow cylindrical shape when in abutment to one another;

wherein the first piston ring is C-shaped and defines a middle portion disposed between a first end portion and a second end portion;

wherein a piston ring gap is disposed between a first distal end of the first end portion and a second distal end of the second end portion;

wherein, when the first piston ring is in abutment with the second piston ring forming the hollow cylindrical shape, the second piston ring does not extend along the middle portion of the first piston ring while the second piston ring does extend along the first end portion and second end portion of the first piston ring;

wherein a cross sectional area taken along a plane containing the longitudinal axis through the middle portion is larger in comparison to a cross sectional area taken along the plane containing the longitudinal axis through either the first end portion or the second end portion; and wherein an outer diameter surface of the first piston ring and a first outer diameter surface of the second piston ring are configured to abut against an inner surface of a bore of a cryogenic pump;

wherein the expander ring has an expander ring gap disposed between a first distal end and a second distal end of the expander ring, and including a first piston ring protrusion of the first piston ring configured to be disposed within the expander ring gap, and extends axially to a full axial extent of the expander ring gap.

* * * * *

UNITED STATES PATENT AND TRADEMARK OFFICE
CERTIFICATE OF CORRECTION

| | |
|---|---|
| PATENT NO. | : 11,326,694 B2 |
| APPLICATION NO. | : 17/247542 |
| DATED | : May 10, 2022 |
| INVENTOR(S) | : Joshua Wayne Steffen |

It is certified that error appears in the above-identified patent and that said Letters Patent is hereby corrected as shown below:

In the Claims

Column 9, Claim 11, Line 29: "ring," should read --ring;--

Column 9, Claim 11, Line 30: "gas" should read --gap--

Column 9, Claim 11, Line 35: "extend" should read --extent--

Signed and Sealed this
Twelfth Day of July, 2022

*Katherine Kelly Vidal*

Katherine Kelly Vidal
*Director of the United States Patent and Trademark Office*